(12) United States Patent
Latham et al.

(10) Patent No.: US 8,873,944 B2
(45) Date of Patent: Oct. 28, 2014

(54) METHODS AND APPARATUS FOR POSITIONING A COIL MOTOR

(71) Applicants: Alexander Latham, Tewksbury, MA (US); David Toebes, Andover, MA (US)

(72) Inventors: Alexander Latham, Tewksbury, MA (US); David Toebes, Andover, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 211 days.

(21) Appl. No.: 13/647,859

(22) Filed: Oct. 9, 2012

(65) Prior Publication Data

US 2014/0098285 A1 Apr. 10, 2014

(51) Int. Cl.

| | | |
|---|---|---|
| G05B 11/42 | (2006.01) |
| G03B 13/34 | (2006.01) |
| G03B 3/10 | (2006.01) |
| G03B 13/36 | (2006.01) |
| H04N 5/232 | (2006.01) |
| G06F 15/00 | (2006.01) |
| G02B 7/28 | (2006.01) |
| G05B 19/19 | (2006.01) |
| G01B 7/14 | (2006.01) |

(52) U.S. Cl.
CPC ........ *G01B 7/14* (2013.01); *G03B 13/36* (2013.01); *H04N 5/23212* (2013.01); *G06F 15/00* (2013.01); *G02B 7/28* (2013.01); *G05B 19/19* (2013.01); *G05B 2219/45178* (2013.01)
USPC .......................................... 396/133; 318/610

(58) Field of Classification Search
CPC .................................. G03B 3/10; G03B 13/34
USPC .......... 396/133; 318/400.37, 400.38, 609, 610
See application file for complete search history.

(56) References Cited

U.S. PATENT DOCUMENTS

| | | | |
|---|---|---|---|
| 5,250,884 A | 10/1993 | Okumura | |
| 5,511,052 A | 4/1996 | Perry | |
| 5,973,468 A * | 10/1999 | Yamauchi | 318/610 |
| 6,972,799 B1 | 12/2005 | Hashimoto | |
| 8,084,969 B2 | 12/2011 | David et al. | |
| 8,138,708 B2 | 3/2012 | Ward et al. | |
| 2003/0012568 A1 | 1/2003 | Ishikawa et al. | |
| 2010/0188032 A1* | 7/2010 | Takai | 318/400.21 |
| 2011/0058093 A1 | 3/2011 | Kim | |
| 2014/0098285 A1 | 4/2014 | Latham et al. | |

FOREIGN PATENT DOCUMENTS

| | | |
|---|---|---|
| WO | WO 2005/091067 A2 | 9/2005 |
| WO | WO 2005/091067 A3 | 9/2005 |

OTHER PUBLICATIONS

Allegro Microsystems, Inc.; "A1456 Closed Loop Micro-Power Hall IC with Full-Bridge Driver, Internal Calibration, and I²C Interface for Camera Auto Focus Applications;" Data Sheet; Jul. 6, 2012; 21 pages.
PCT Search Report and Written Opinion of the ISA dated Dec. 6, 2013; for PCT Pat. App. No. PCT/US2013/060355; 14 pages.

(Continued)

*Primary Examiner* — Clayton E Laballe
*Assistant Examiner* — Noam Reisner
(74) *Attorney, Agent, or Firm* — Daly, Crowley, Mofford & Durkee, LLP (57) ABSTRACT

Methods and apparatus for providing a position sensor to sense the position of a ferromagnetic target and generate a target position signal, a scaling block to receive the target position signal, and a digital RC filter to generate an output using bit shifting for dividing by some factor of two, wherein all division for computations in the RC filter are performed by bit shifts.

24 Claims, 7 Drawing Sheets

(56) References Cited

OTHER PUBLICATIONS

Anonymous; "Logix5000 Controllers Advanced Process Control and Drives Instructions—Reference Manual;" XP055087241; http://literature.rockwellautomation.com/idc/groupd/literature/documents/rm/1756-rm006_-en-p.pdf; Sep. 2010; 225 pages.

U.S. Appl. No. 13/904,356, filed May 29, 2013, Cadugan et al.
Response to Office Action dated Feb. 13, 2014, U.S. Appl. No. 13/439,082, filed Apr. 4, 2012, 15 pages.
Office Action dated Jun. 16, 2014 for U.S. Appl. No. 13/904,356, filed May 29, 2013.

* cited by examiner

METHODS AND APPARATUS FOR POSITIONING A COIL MOTOR

SUMMARY

The present invention provides method and apparatus for a linear sensor integrated circuit (IC) that provides output signals to control a motor, such as a coil motor, to control a lens in auto focus digital camera applications. The current in the coil to drive the motor changes until the position of the external lens assembly or CCD array results in a sensor, such as a Hall effect sensor, having a voltage that matches the input signal position command. With digital RC filter operation, which enables resource sharing, a cost effective device and compact device is provided.

In one aspect of the invention, an integrated circuit comprises: a position sensor to sense the position of a ferromagnetic target and generate a target position signal, a scaling block to receive the target position signal, a digital RC filter to receive the target position signal, a reference position, and a scale factor, and generate an output, the RC filter including: a multiplier to multiply the scale factor and a difference of the reference position and the target position signal, and a bit shifter for dividing by some factor of two, wherein all division for computations in the RC filter are performed by bit shifts, a PID controller coupled to the RC filter to receive the output from the RC filter, and an output driver to provide a position output signal.

The integrated circuit can further include one or more of the following features: computations in the RC filter and computations in the scaling block share a multiplier, the target includes a lens having a ferromagnetic material for camera auto focus, the position sensor includes a Hall element, the PID controller receives position information from the position sensor, wherein the digital filter computes $y[n+1]+(y[n]*2^z+k*(x-y[n]))/2^z$, where x is a position value, k is a scaling value, z is a positive integer, and y is the output to the PID, and/or the output driver is configured to generate the position output signal to an actuator coil.

In another aspect of the invention, a system comprises a camera having auto-focus capability, the camera comprising: a position sensor to sense the position of a ferromagnetic target and generate a target position signal, a scaling block to receive the target position signal, a digital RC filter to receive the target position signal, a reference position, and a scale factor, and generate an output, the RC filter including: a multiplier to multiply the scale factor and a difference of the reference position and the target position signal, and a bit shifter for dividing by some factor of two, wherein all division for computations in the RC filter are performed by bit shifts, a PID controller coupled to the RC filter to receive the output from the RC filter, and an output driver to provide a position output signal.

The system can further include one or more of the following features: computations in the RC filter and computations in the scaling block share a multiplier, the target includes a lens having a ferromagnetic material for camera auto focus, the position sensor includes a Hall element, the PID controller receives position information from the position sensor, wherein the digital filter computes $y[n+1]=(y[n]*2^z+k*(x-y[n]))/2^z$, where x is a position value, k is a scaling value, z is a positive integer, and y is the output to the PID, and/or the output driver is configured to generate the position output signal to an actuator coil.

In a further aspect of the invention, a system comprises: a camera having auto-focus capability, the camera comprising: means for sensing a position of a ferromagnetic target; a digital RC filter means coupled to the means for sensing a position for generating an output, the digital RC filter including: a multiplier to multiply the scale factor and a difference of the reference position and the target position signal, and a bit shifter for dividing by some factor of two, wherein all division for computations in the RC filter are performed by bit shifts, a PID controller means coupled to the RC filter to receive the output from the RC filter; and an output driver means coupled to the PID controller means.

In another aspect of the invention a method comprises: employing a position sensor to sense the position of a ferromagnetic target and generate a target position signal, employing a scaling block to receive the target position signal, employing a digital RC filter to receive the target position signal, a reference position, and a scale factor, and generate an output, the RC filter including: a multiplier to multiply the scale factor and a difference of the reference position and the target position signal, and a bit shifter for dividing by some factor of two, wherein all division for computations in the RC filter are performed by bit shifts, employing a PID controller coupled to the RC filter to receive the output from the RC filter, and employing an output driver to provide a position output signal.

The method can further include one of more of: computations in the RC filter and computations in the scaling block share a multiplier, the target includes a lens having a ferromagnetic material for camera auto focus, and/or the digital filter computes $y[n+1]=(y[n]*2^z+k*(x-y[n]))/2^z$ where x is a position value, k is a scaling value, z is a positive integer, and y is the output to the PID.

BRIEF DESCRIPTION OF THE DRAWINGS

The foregoing features of this invention, as well as the invention itself, may be more fully understood from the following description of the drawings in which.

DETAILED DESCRIPTION

Figure 1:
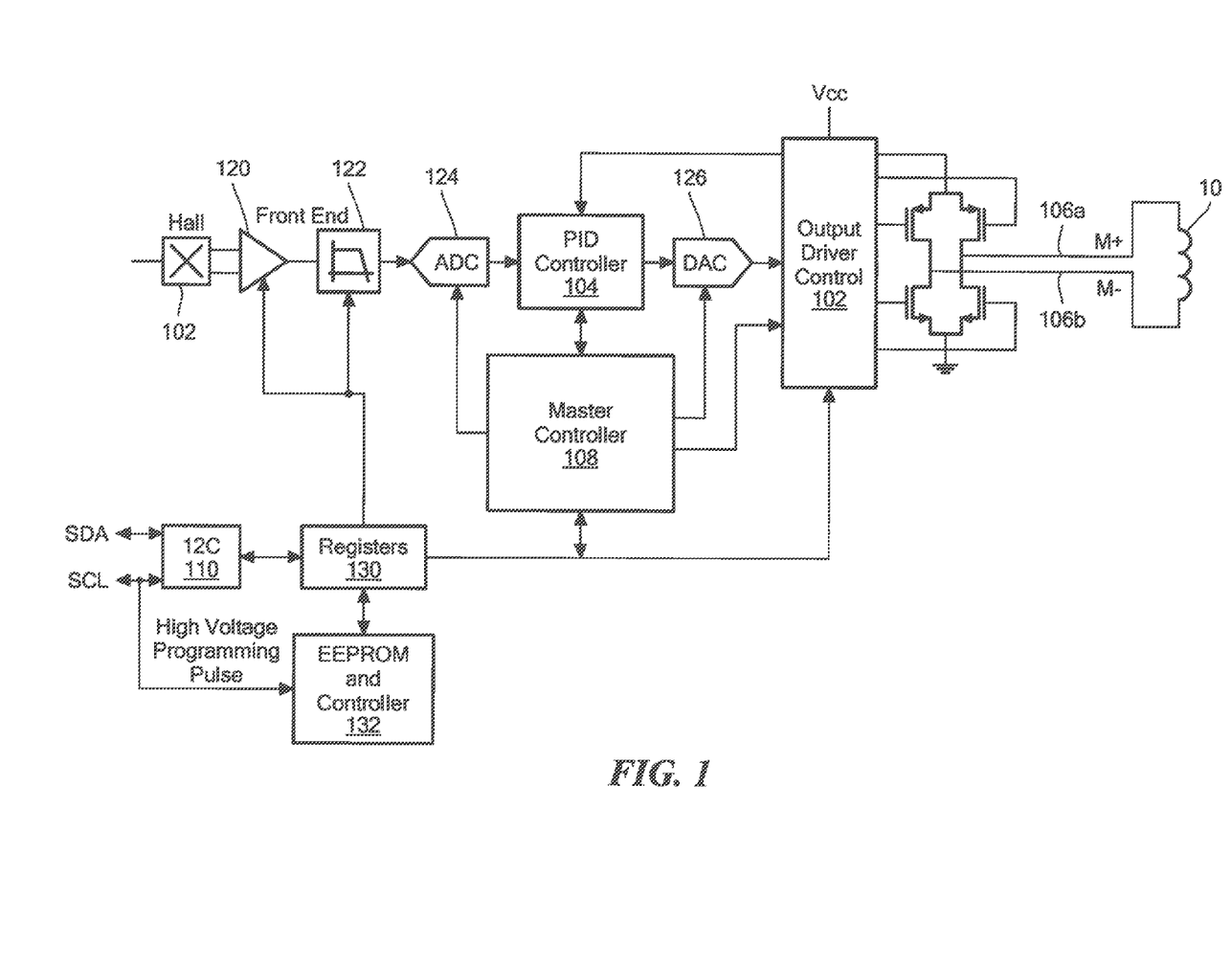
FIG. 1 is a schematic representation of a position sensor and driver in accordance with exemplary embodiments of the invention.

FIG. 1 shows a system 100 having digital auto-focus in accordance with exemplary embodiments of the invention. A sensor 102, such as a Hall effect sensor, determines a position of a magnet on the target, e.g., lens, that is provided to a digital proportional-integral-derivative (PID) controller 104. The PID controller 104 is connected to an output driver 106 that provides output signals 106a,b that can be coupled to an actuator coil 10 for moving the lens. A controller 108 controls overall operation of the device and an interface 110 provides serial, for example, communication with a processor, microcontroller or other device.

In an exemplary embodiment, the sensor 102 signal is amplified 120, filtered 122, and converted by an ADC 124 from an analog to a digital signal, which is input to the PID controller 104. The output of the PID controller 104 is converted by a DAC 126 from a digital to an analog signal before being sent to the output driver 102.

A series of registers 130 are coupled to the controller 108 and output driver 102 to store various information including position information, PID information, such as coefficients, ADC/DAC information, calibration information, bit shift information, etc. The registers 130 are available for read/write operations via the interface 110 over the serial SDA, SCL lines. An EEPROM and controller 132 are coupled to the registers and to the SCL line for programming operations. It is understood that any suitable memory device can be instead of, or in addition to, an EEPROM.

Figure 2:
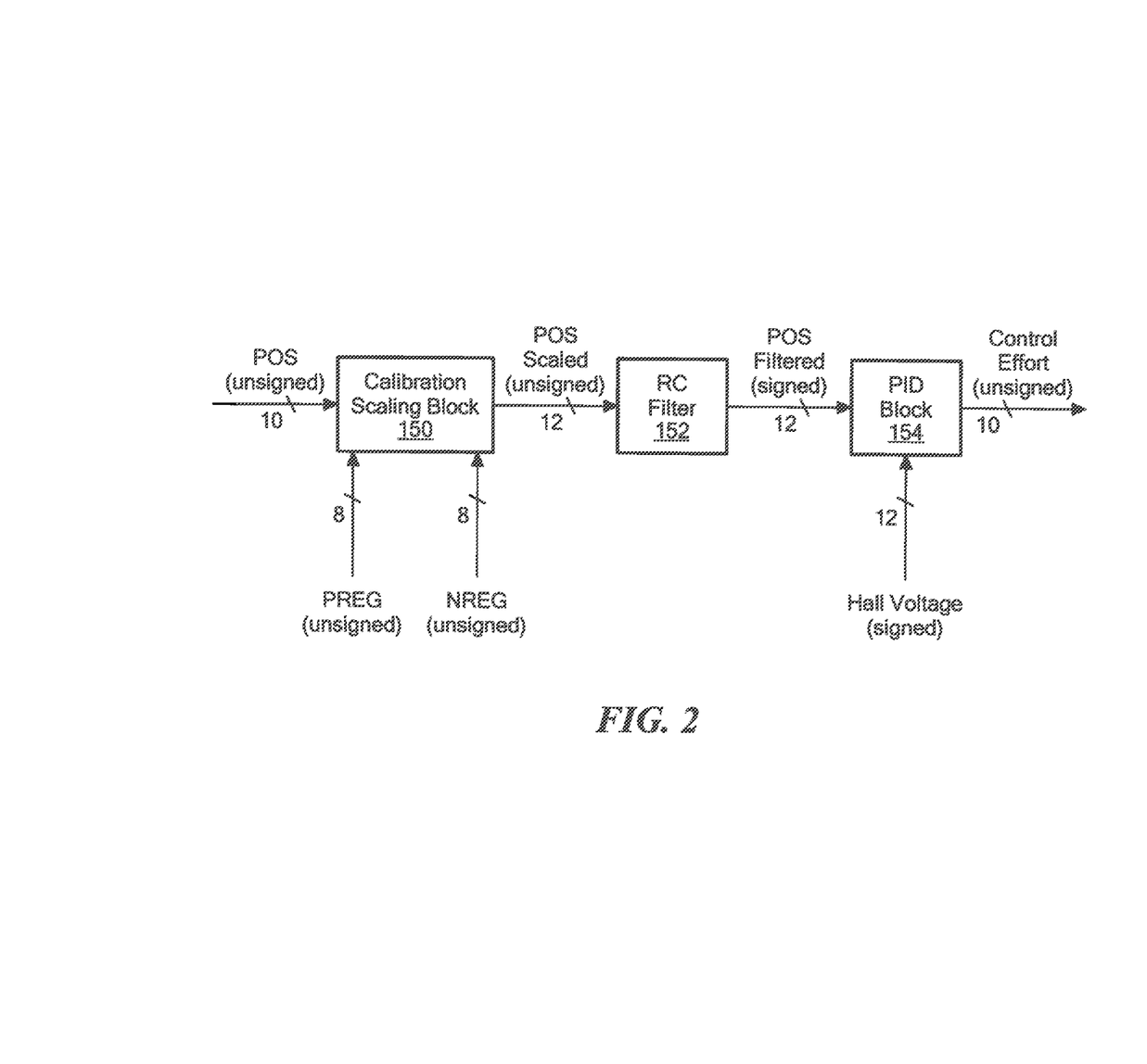
FIG. 2 is a schematic representation of a PID controller.

FIG. 2 shows further detail for the PID controller 104 of FIG. 1. In general, the PID controller 104 calculates an error value between the Hall effect sensor 102 (FIG. 1) and a target 10, e.g., lens, location programmed by the user, for example. In exemplary embodiments, coefficients for the PID controller 104 are selected to minimize controller error and reduce settling time.

Position information, shown as ten bits, is provided to a calibration scaling block 150, which provides scaled lens position information to a RC filter 152. The PID block 154 receives an output from the digital RC filter 152 and processes the filtered signal to provide an output control signal to adjust the lens position.

The calibration scaling block 150 receives positive register 152 and negative register 154 information during calibration. The lens can be driven to a first maximum position and the location stored, such as in a PREG register, and then driven to a second maximum position, opposite the first, and this location stored in a DREG register. This aligns the range of travel across the resolution of the device.

The scaled position information is provided to a digital RC filter 152, which outputs filtered and signed position information to the PID block 154. The RC filter provides a smooth change in the reference position on the PID controller. Information, e.g., voltage, is provided from the Hall sensor to the PID block 154, which outputs control information that can be used to move the lens.

Figure 3:
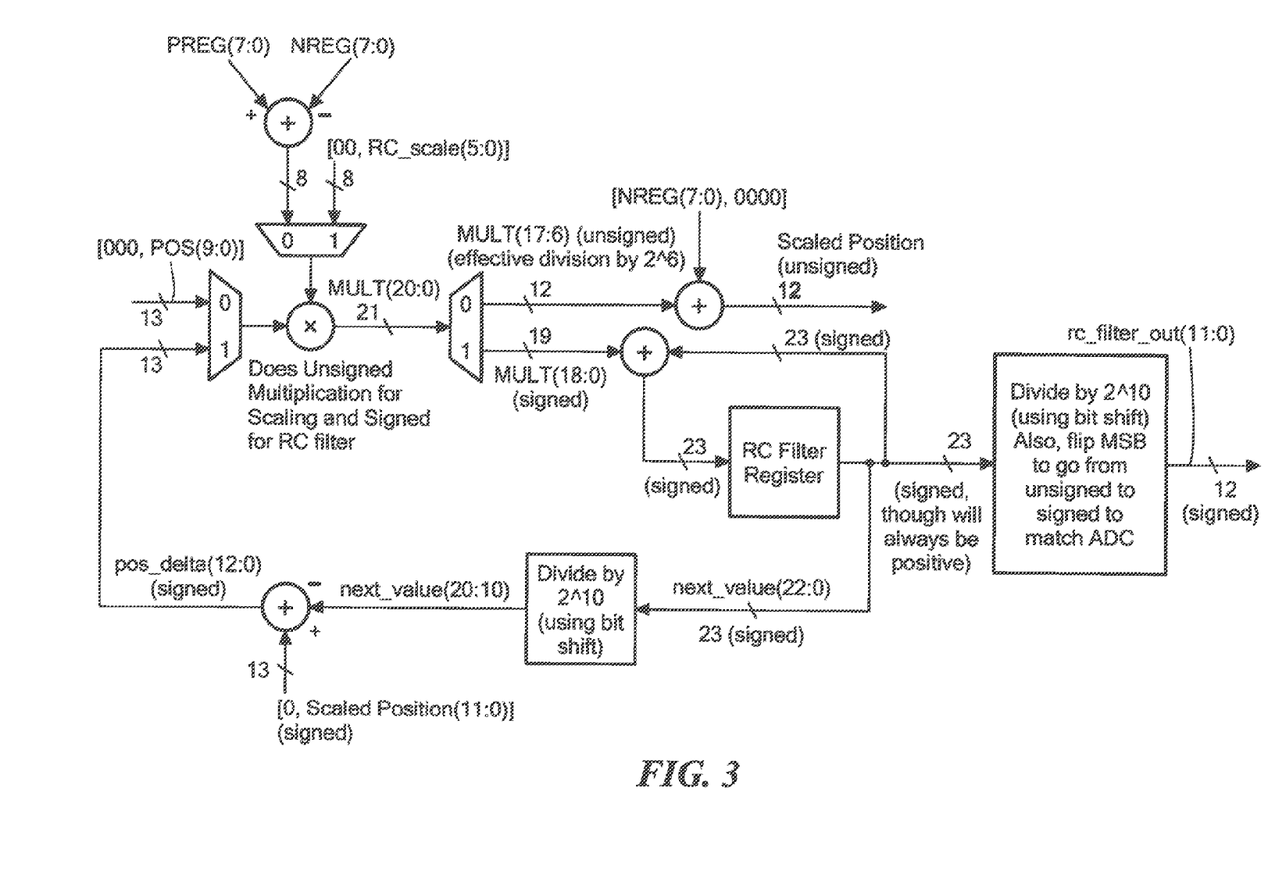
FIG. 3 is a schematic representation of a RC filter and scaling block.

FIG. 3 shows an exemplary implementation of the calibration scaling block 150 and RC filter 152 of FIG. 2. A programmable digital approximation of an RC filter is used as the input filter to a ND (proportional, integral, derivative) controller, such as the PID block 154 of FIG. 2. An exemplary position update implementation is set forth below:

$$y[n+1]=y[n]+k*(x[n]-y[n])$$

where, x is the desired input position to the PID controller, y is the reference position sent to the PID controller, and k is a scale value between 0 and 1. When x is abruptly changed, y will move toward x with an exponential behavior similar to an RC analog filter response to a step input. The effective time constant of this digital RC approximation can be programmed by changing either k and/or the update rate.

In an exemplary embodiment, space expensive division is avoided by modifying the equation to require division only by a factor of two, which can be accomplished with bit shifts. An exemplary transformed equation is set forth below:

$$y[n+1]=(y[n]*2^z+k*(x-y[n]))/2^z$$

which provides division by $2^z$, Where z is a positive integer and k is an integer between 0 and $2^z$. This digital RC could be used as the input filter for any controller, including both analog and digital.

After running calibration, PREG and NREG contain the actual maximum and minimum values needed for full lens travel. In one embodiment, only the most significant 8 bits out of the 12 bit ADC are stored in PREG and NREG, effectively rounding the saved calibration values. In the illustrated embodiment, the user input position value POS is ten bits and should represent the full lens travel range. Thus, a user POS value of 0x0 needs to map to the rounded, twelve bit NREG value and a user POS value of 0x3FF needs to map to the rounded, twelve bit PREG value, To rescale the POS values the following can be used:

$$X=((PREG-NREG) \times POS)/1024+NREG$$

where PREG and NREG are 12 bits wide with the top 8 bits being those in the PREG and NREG registers and the bottom 4 bits being zero for minimized multiplier size. Then X is the 12 bit output which is provided as input for the RC filter. In one embodiment, there is a small approximation since POS should be divided by 1023. However, dividing by 1024 allows for the division to be done by a bit shift. The order of operations requires that the multiplication of POS by (PREG-NREG) is done before the division to improve accuracy.

It is understood that the resealing event may only need to occur when a new POS, PREG, or NREG value is loaded. Other than that, the multiplier is an available resource that will be shared with the RC Filter logic described below.

There is a need to allow any changes of the POS value to be implemented as an RC curve. In an exemplary embodiment, the following is used:

$$y[n+1]=(y[n]*2^{10}+k*(x-y[n]))/2^{10}$$

where x is the 12 bit resealed user POS value, k is a scaling value, and y is the output to the PID. The order of operations requires that the downshift be performed at the end allowing for a multiplier to be of a smaller size and still retain the accuracy in the equation.

It should be noted that the effective value of k is scaled down by 1024 due to the '$2^{10}$' scaling terms in the equation. The selectable scaling ranges allows for k to be represented by a 1 to 8 bit number which allows for easy sharing of the multiplier with the resealing logic, In FIG. 3, it is shown that for this embodiment, k was chosen to be 6 bits wide with the top two bits of the 8 bit value going into the multiplier being fixed at zero.

Figure 3A:
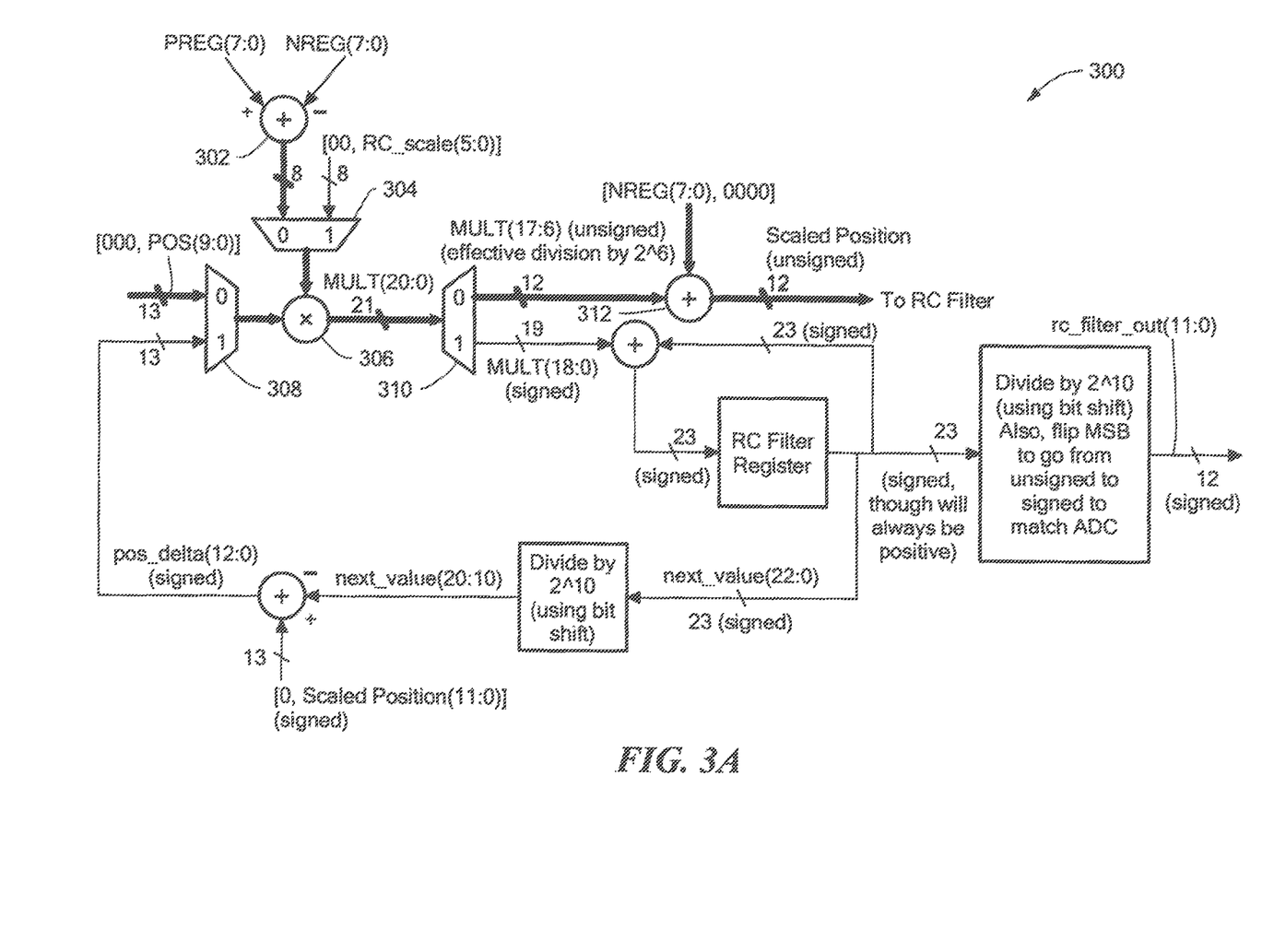
FIG. 3A is a schematic representation of scaling block operation for the implementation of FIG. 3.

FIG. 3A shows the path during calibration scaling. In accordance with $$X=((PREG-NREG) \times POS)/1024+NREG,$$

NREG(7:0) is subtracted from PREG(7:0) at summer 302 having an output which passes through a multiplexer 304 to a multiplier 306, which receives POS(9:0) via multiplexer 308. The multiplier 306 output passes through demultiplexer 310 to summer 312, which has NREG(7:0) as in input. The output of the summer 312 is twelve bit POS scaling information.

Figure 3B:
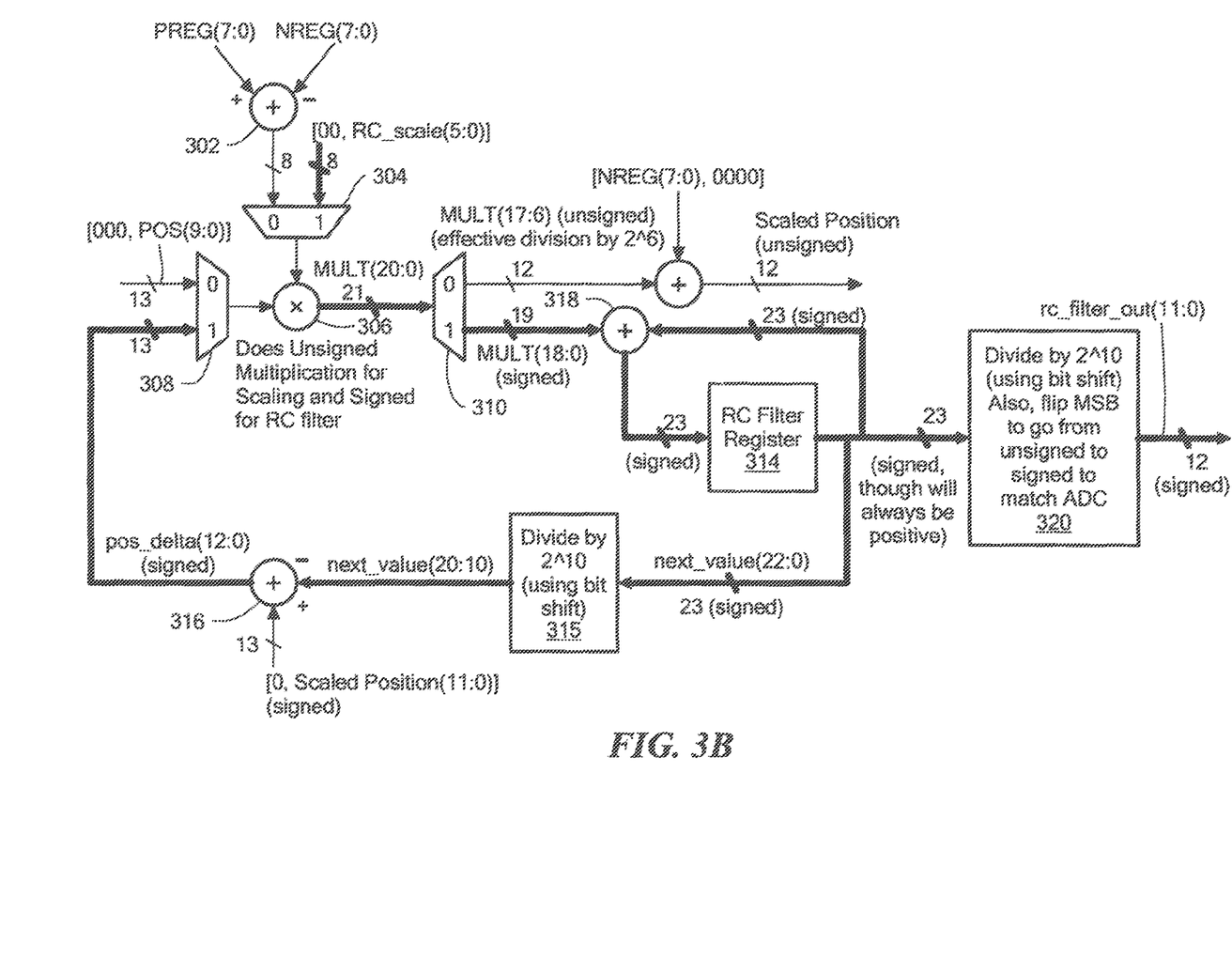
FIG. 3B is a schematic representation of RC filter operation for the implementation of FIG. 3.

FIG. 3B shows the RC filter implementation path. Scaling value k RC_scale[5:0] passes though multiplexer 304 to the multiplier 306. Value $y[n]*2^z$, which is stored from the last update in RC filter register 314 and bit shifted 315 to achieve division by $2^{10}$ is provided to summer 316 for subtraction from the scaled position value (x in the equation). The output of the summer 316 (x-y[n]) is provided to the multiplier 306 via multiplexer 308. The multiplier 306 output (k*(x-y[n])) passes through demultiplexer 310 to summer 318 for addition with the value in the RC filter register) ($y[n]*2^{10}$). The summer 318 output is then provided to the RC filter register 314 and then to a bit shift module 320 to provide the RC filter output (y[n+1]), which is sent to the PID block.

With this arrangement, the multiplier 306 is used for scaling and RC filter operations. As can be seen, division by a factor of 2 is achieved by bit shifts. By implementing division in bit shift operations, significant space savings are achieved as compared with divisions which cannot be performed with bit shifting alone.

Figure 4:
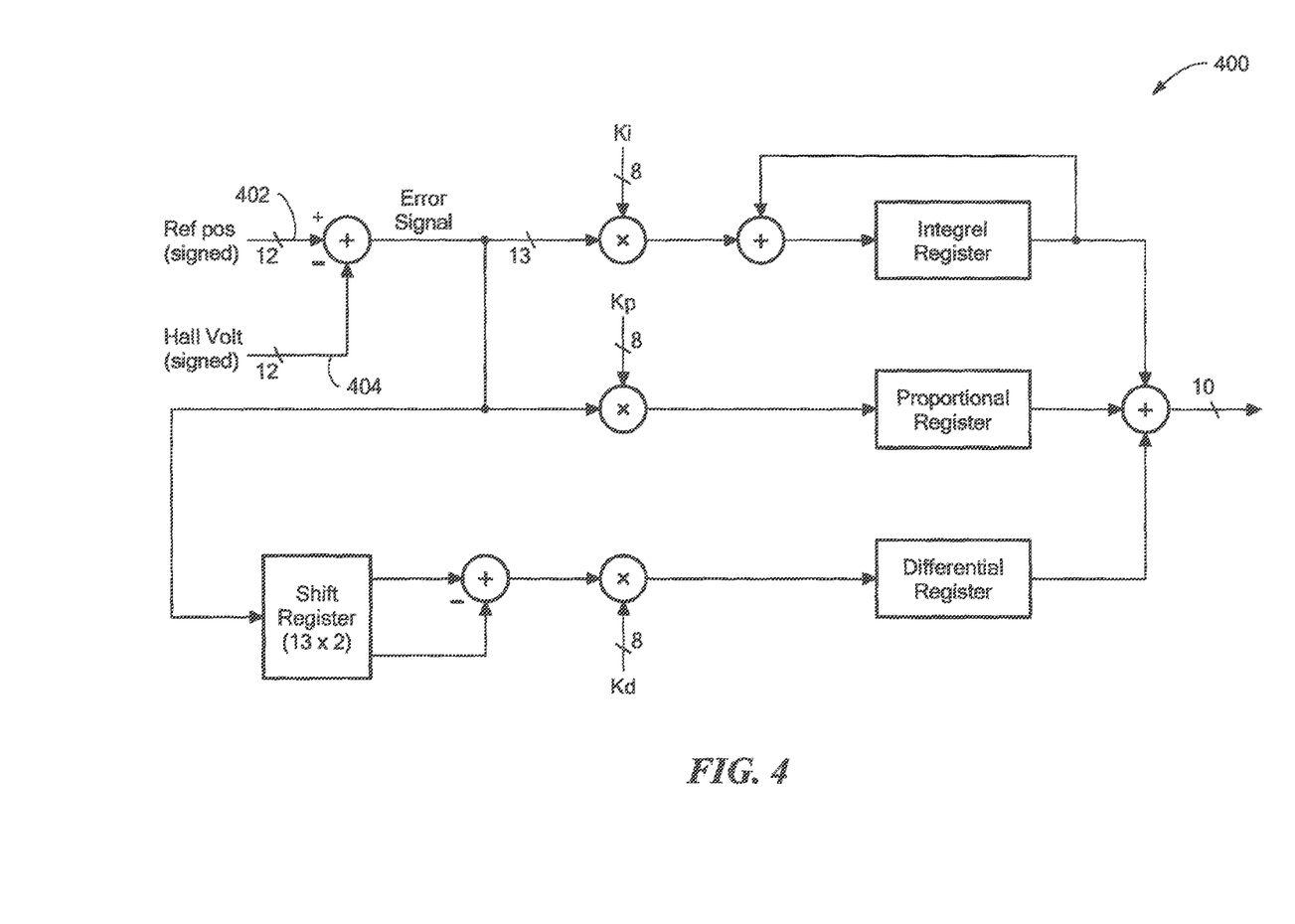
FIG. 4 is a schematic representation of a PID block for the implementation of FIG. 2.

FIG. 4 shows an exemplary PID implementation 400 in which the RC filter output 402 and the Hall sensor output 404 are provided as PID inputs. The PID output provides a control signal for the coil to control the target, e.g., lens, movement. It is understood that PID blocks are well known in the art.

Figure 5:
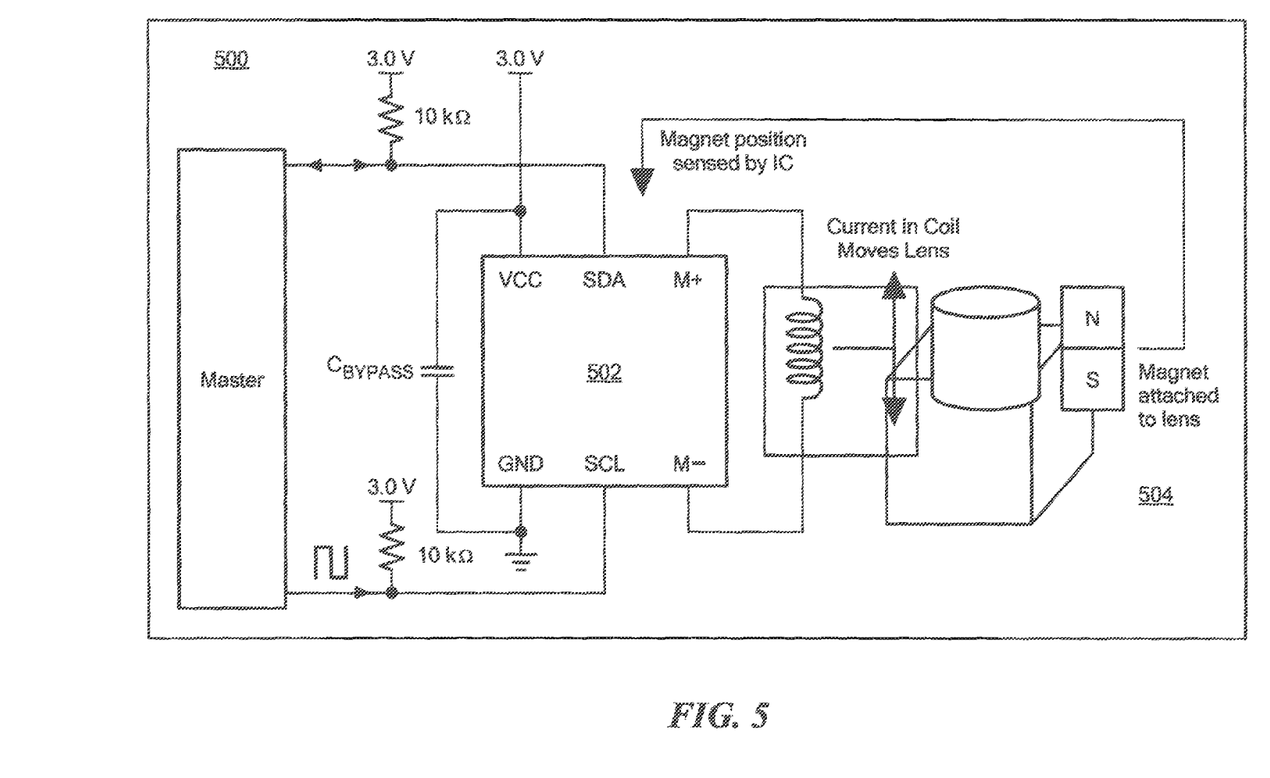
FIG. 5 is an exemplary implementation of a camera having an integrated circuit position sensor and driver.

FIG. 5 shows an exemplary circuit diagram of a camera 500 having a position sensor and driver integrated circuit 502 to sense a position of a target, such as a lens, and to generate a drive signal to actuate a motor until a desired position for the target is achieved. In one embodiment, the sensor is provided as a Hall effect sensor to generate a voltage corresponding to a ferromagnetic target location on a lens in an auto-focus module 504. In one embodiment, the ferromagnetic target comprises a hard ferromagnetic material, such as a permanent magnet.

It is understood that a position sensor can include a variety of magnetoresistive devices, such as giant magnetoresistance (GMR), anisotropic magnetoresistance (AMR), and the like. In one embodiment, the integrated circuit includes a Hall effect sensor and a magnetoresistive sensor.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An integrated circuit, comprising:
a position sensor to sense the position of a ferromagnetic target and generate a target position signal;
a scaling block to receive the target position signal;
a digital RC filter to receive the target position signal, a reference position, and a scale factor, and generate an output, the RC filter including:
a multiplier to multiply the scale factor and a difference of the reference position and the target position signal; and
a bit shifter for dividing by some factor of two, wherein all division for computations in the RC filter are performed by bit shifts;
a PID controller coupled to the RC filter to receive the output from the RC filter; and
an output driver to provide a position output signal.

2. The system according to claim 1, wherein computations in the RC filter and computations in the scaling block share a multiplier.

3. The system according to claim 1, wherein the target includes a lens assembly having a ferromagnetic material for camera auto focus.

4. The system according to claim 3, wherein the ferromagnetic material comprises a hard ferromagnetic material.

5. The system according to claim 1, wherein the position sensor includes a Hall element.

6. The system according to claim 5, wherein the position sensor further includes a magnetoresistive element.

7. The system according to claim 1, wherein the position sensor includes a magnetoresistive element.

8. The system according to claim 1, Wherein the PID controller receives position information from the position sensor.

9. The system according to claim 1, wherein the digital filter computes $$y[n+1]=(y[n]*2^z+k*(x-y[n]))/2^z$$

where x is a position value, k is a scaling value, z is a positive integer, and y is the output to the PID.

10. The system according to claim 1, wherein the output driver is configured to generate the position output signal to an actuator coil.

11. A system, comprising:
a camera having auto-focus capability, the camera comprising:
a position sensor to sense the position of a ferromagnetic target and generate a target position signal;
a scaling block to receive the target position signal;
a digital RC filter to receive the target position signal, a reference position and a scale factor, and generate an output, the RC filter including:
a multiplier to multiply the scale factor and a difference of the reference position and the target position signal; and
a bit shifter for dividing by some factor of two, wherein all division for computations in the RC filter are performed by bit shifts;
a PIED controller coupled to the RC filter to receive the output from the RC filter; and
an output driver to provide a position output signal.

12. The system according to claim 11, wherein computations in the RC filter and computations in the scaling block share a multiplier.

13. The system according to claim 11, wherein the target includes a lens having a ferromagnetic material for camera auto focus.

14. The system according to claim 11, wherein the position sensor includes a Hall element.

15. The system according to claim 14, wherein the position sensor further includes a magnetoresistive element.

16. The system according to claim 11, wherein the position sensor includes a magnetoresistive element.

17. The system according to claim 11, wherein the PID controller receives position information from the position sensor.

18. The system according to claim 11, wherein the digital filter computes $$y[n+1]=(y[n]*2^z+k*(x-y[n]))/2^z$$

where x is a position value, k is a scaling value, z is a positive integer, and y is the output to the PID.

19. The system according to claim 11, wherein the output driver is configured to generate the position output signal to an actuator coil.

20. A system, comprising:
a camera having auto-focus capability, the camera comprising:
means for sensing a position of a ferromagnetic target;
a digital RC filter means coupled to the means for sensing a position for generating an output, the digital RC filter including:
a multiplier to multiply the scale factor and a difference of the reference position and the target position signal; and
a bit shifter for dividing by some factor of two, wherein all division for computations in the RC filter are performed by bit shifts;
a PID controller means coupled to the RC filter to receive the output from the RC filter; and an output driver means coupled to the ND controller means.

21. A method, comprising:
employing a position sensor to sense the position of a ferromagnetic target and generate a target position signal;
employing a scaling block to receive the target position signal;
employing a digital RC filter to receive the target position signal, a reference position, and a scale factor, and generate an output, the RC filter including:
a multiplier to multiply the scale factor and a difference of the reference position and the target position signal; and
a bit shifter for dividing by some factor of two, wherein all division for computations in the RC filter are performed by bit shifts;
employing a ND controller coupled to the RC filter o receive the output from the RC filter; and
employing an output driver to provide a positions output signal.

22. The method according to claim 21, wherein computations in the RC filter and computations in the scaling block share a multiplier.

23. The method according to claim 21, wherein the target includes a lens having a ferromagnetic material for camera auto focus.

24. The method according to claim 21, wherein the digital filter computes $$y[n+1]=(y[n]*2^z k*(x-y[n]))/2^z$$

where x is a position value, k is a scaling value, z is a positive integer, and y is the output to the PID.

* * * * *

UNITED STATES PATENT AND TRADEMARK OFFICE
CERTIFICATE OF CORRECTION

PATENT NO. : 8,873,944 B2  
APPLICATION NO. : 13/647859  
DATED : October 28, 2014  
INVENTOR(S) : Alexander Latham et al.

It is certified that error appears in the above-identified patent and that said Letters Patent is hereby corrected as shown below:

Specification

Column 1, line 35 delete "y[n+1] +" and replace with --y[n+1] =--.

Column 1, line 40 delete "a system comprises a" and replace with --a system comprises: a--.

Column 2, line 10 delete "'invention a method" and replace with --invention, a method--.

Column 2, line 24 delete "one of more of" and replace with --one or more of--.

Column 2, line 28 delete "/$2^z$ where x is" and replace with --/$2^z$, where x is--.

Column 3, line 3 delete "output driver 102." and replace with --output driver 106.--.

Column 3, line 5 delete "output driver 102" and replace with --output driver 106--.

Column 3, line 32 delete "in a DREG register" and replace with --in a NREG register--.

Column 3, line 44 delete "to a ND" and replace with --to a PID--.

Column 3, line 62 delete "2^z, Where z" and replace with --2^z, where z--.

Column 4, line 8 delete "value, To" and replace with --value. To--.

Column 4, line 21 delete "the resealing event" and replace with --the rescaling event--.

Column 4, line 30 delete "resealed user" and replace with --rescaled user--.

Column 4, line 39 delete "resealing" and replace with --rescaling--.

Column 4, line 39 delete "logic, In" and replace with --logic. In--.

Column 4, line 62 delete "register) (y" and replace with --register (y--.

Signed and Sealed this  
Twenty-ninth Day of March, 2016

Michelle K. Lee  
*Director of the United States Patent and Trademark Office*

CERTIFICATE OF CORRECTION (continued)
U.S. Pat. No. 8,873,944 B2

Claims

Column 5, line 65 delete "claim 1, Wherein" and replace with --claim 1, wherein--.

Column 6, line 26 delete "a PIED controller" and replace with --a PID controller--.

Column 7, line 1 delete "ND controller" and replace with --PID controller--.

Column 8, line 1 delete "ND controller" and replace with --PID controller--.

Column 8, line 1 delete "RC filter o" and replace with --RC filter to--.

Column 8, line 14 delete "y[n+1]=y[n]*$2^z$k*" and replace with --y[n+1]=*$2^z$+k*--.